United States Patent [19]

Komura et al.

[11] 4,376,705
[45] Mar. 15, 1983

[54] FILTERING AND DRYING APPARATUS

[75] Inventors: Kisaburo Komura; Masamitsu Ohshima, both of Aichi; Masato Matsuda, Kuwana, all of Japan

[73] Assignee: Nippon Dyeing Machine Manufacturing Co. Ltd., Ama, Japan

[21] Appl. No.: 301,207

[22] Filed: Sep. 11, 1981

[30] Foreign Application Priority Data

Sep. 19, 1980 [JP] Japan ............................ 55-131063

[51] Int. Cl.³ ........................................ B01D 25/38
[52] U.S. Cl. ................................................. 210/413
[58] Field of Search ..................... 210/298, 413–415

[56] References Cited

U.S. PATENT DOCUMENTS

| | | | |
|---|---|---|---|
| 1,865,061 | 6/1932 | Grob | 210/413 X |
| 2,540,474 | 2/1951 | Cox | 210/415 X |
| 2,834,474 | 5/1958 | Jalkanen | 210/413 X |
| 2,901,763 | 9/1959 | Jalkanen | 210/415 X |
| 3,836,464 | 9/1974 | Brookins et al. | 210/413 |

Primary Examiner—Thomas G. Wyse
Attorney, Agent, or Firm—Dennison, Meserole, Pollack & Scheiner

[57] ABSTRACT

A filtering and drying apparatus has a vertically disposed casing, a bottom plate detachably carried at the bottom of the casing and supporting a filter plate thereon, a valve chamber provided at the central portion of the bottom plate and adapted for discharging cakes in the casing, and an upright rotary shaft disposed in the center of the casing for vertical movement along its own axis and for forward and reverse rotations about its own axis. The rotary shaft is provided at the lowermost end thereof with at least a pair of rotary arms having a plurality of stirring blades. Each of the stirring blades has on one side thereof a face effective to scrape off the cakes to the right and left and, on the other side, another face effective to move the cakes toward the central outlet of the casing.

10 Claims, 12 Drawing Figures

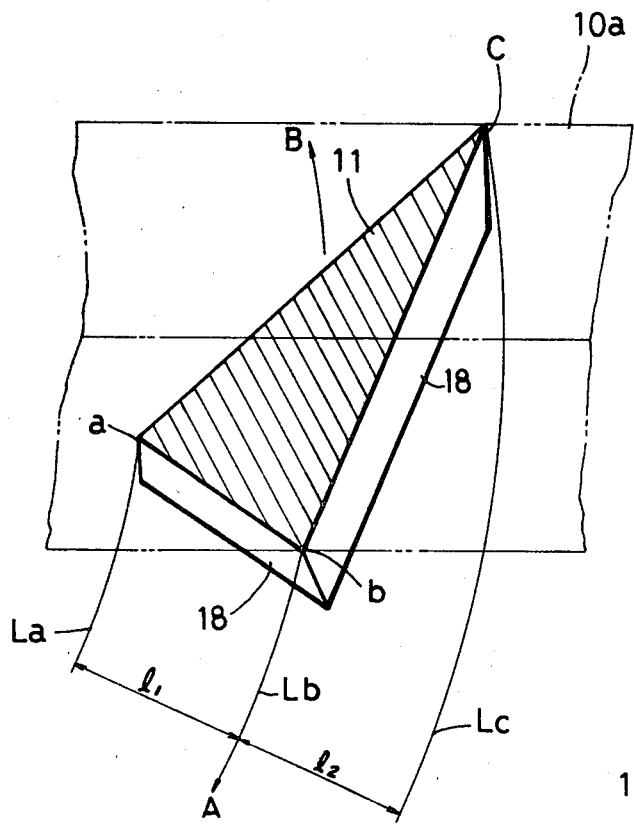
Fig.4
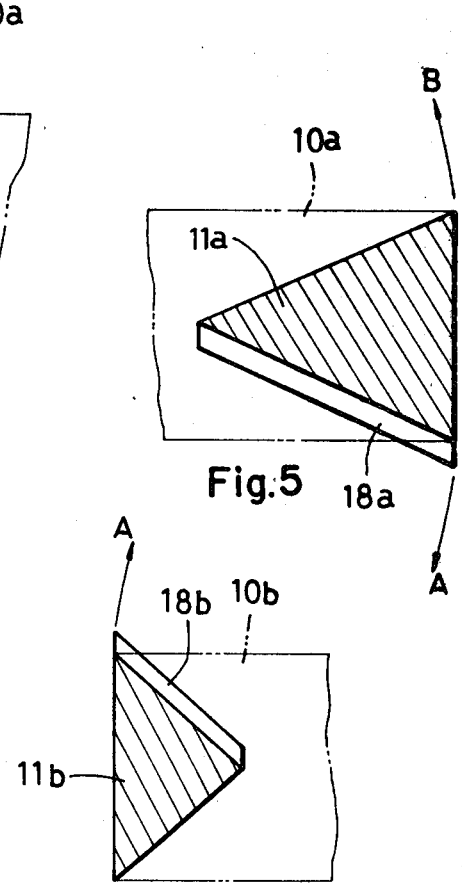
Fig.5
Fig.6
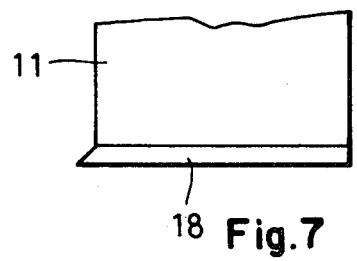
Fig.7
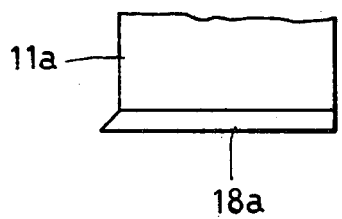
Fig.8
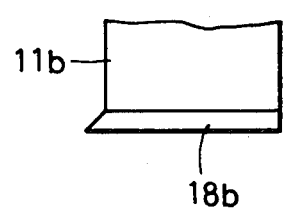
Fig.9

FILTERING AND DRYING APPARATUS

BACKGROUND OF THE INVENTION

1. Field of the Invention

This invention relates to an apparatus for filtering slurries containing dyestuffs, chemicals and other polymers and for collecting and discharging solids (hereinafter referred to as "cakes") produced thereby.

2. Description of the Prior Art

In a conventional Nutche filter where cakes must be discharged outside, the cakes are removed by human power as with a shovel or other suitable raking tool, or solvent is added to the cakes to be refomed into slurry which will be discharged after the filtration cycle is finished. The former method using human power requires considerable labor and time, and in addition, some cakes are injurious to human body, which is apparently a problem in view of environmental hygiene. The latter type of filters where cakes are reformed into slurry doesn't, unlike the former type, require human power because of the cakes being in the form of slurry. However, if it is desired to obtain cakes as solids, it is necessary to dry the slurry liquids.

Accordingly, an object of the present invention is to provide a novel filtering and drying apparatus which is effective to wash and dry cakes after filtration cycle is finished, while such cakes are stirred uniformly, and is adapted to automatically discharge the dried cakes, thus leading to reduced operation time.

Another object of the present invention is to provide a filtering and drying apparatus which is simple and inexpensive to build and operate.

A further object of the present invention is to provide a fitering and drying apparatus which can prevent discharges from depositing on the side wall or remaining in the casing thereof, whereby yield of cakes may be increased with improved ease of cleaning operation of the casing inside.

A still further object of the present invention is to provide a filtering and drying apparatus which is highly versatile for a wide range of applicable slurries.

SUMMARY OF THE INVENTION

In a preferred embodiment, the inventive filtering and drying apparatus comprises a generally cylindrical casing, a bottom plate detachably carried at the bottom of the casing and supporting a filter plate thereon, a valve chamber provided at the central portion of the bottom plate and adapted for discharging cakes in the casing, and an upright rotary shaft disposed in the center of the casing for vertical movement along its own axis and for forward and reverse rotations about its own axis. The rotary shaft is provided at the lowermost end thereof with at least a pair of rotary arms having a plurality of stirring blades. Each of the stirring blades has on one side thereof a face effective to scrape off the cakes to the right and left and, on the other side, another face effective to move the cakes toward the central outlet of the casing. With this arrangement, switching from stirring action to discharging action of the blades may be accomplished by simply altering the direction of rotation of the rotary shaft. Furthermore, the valve chamber may be situated generally at the central portion of the casing bottom because of the cakes being moved toward the center at all times by the blades. Additionally, since the rotary shaft is so designed as to move vertically and rotate both in forward and reverse directions, the stirring blades may be actuated to suit the type and quantity of cakes after filtration cycle is finished.

According to an alternative embodiment, one of the rotary arms has a plurality of scraping members, each of which having an inwardly facing surface effective to move the cakes toward the valve chamber during forward rotation of the rotary shaft and an outwardly facing surface effective to move the cakes outwardly during reverse rotation of the rotary shaft; and the other rotary arm has a plurality of flattening members, each of which having a stirring plate effective to move the cakes outwardly during forward rotation of the rotary shaft and a flattening bar secured to the lower end of the stirring plate and effective to flatten the cake surfaces. Further, the valve chamber has a discharge valve carried therein for vertical movement and an exhaust valve carried thereon for alternately sealing and releasing the valve chamber. With this arrangement, when the rotary shaft is rotated in forward direction, the cakes may be scraped and discharged; and when in reverse rotation, they may be stirred and flattened. Specifically, the inwardly facing surfaces of the scraping members and the outwardly facing surfaces of the flattening members may produce circulating flow for cakes to be effectively mixed and stirred. Furthermore, the valve chamber is adapted to remove the central portion of the dried cake layer, so as to prevent cakes from remaining in the casing and discharge them speedily.

BRIEF DESCRIPTION OF THE DRAWINGS

Preferred embodiments of the present invention will now be described with reference to the accompanying drawings, in which:

FIG. 4 is an enlarged sectional view of the stirring blades taken along the line IV—IV of FIG. 3;

FIG. 5 is an enlarged sectional view of the stirring blades taken along the line V—V of FIG. 3;

FIG. 6 is an enlarged sectional view of the stirring blades taken along the line VI—VI of FIG. 3;

FIGS. 7 through 9 are fragmentary side views, on an enlarged scale, of the lower end of each rotary blade;

DETAILED DESCRIPTION OF THE PREFERRED EMBODIMENTS

Referring now to FIGS. 1 through 9, there is shown a filtering and drying apparatus according to the first embodiment of the present invention.

Figure 1:
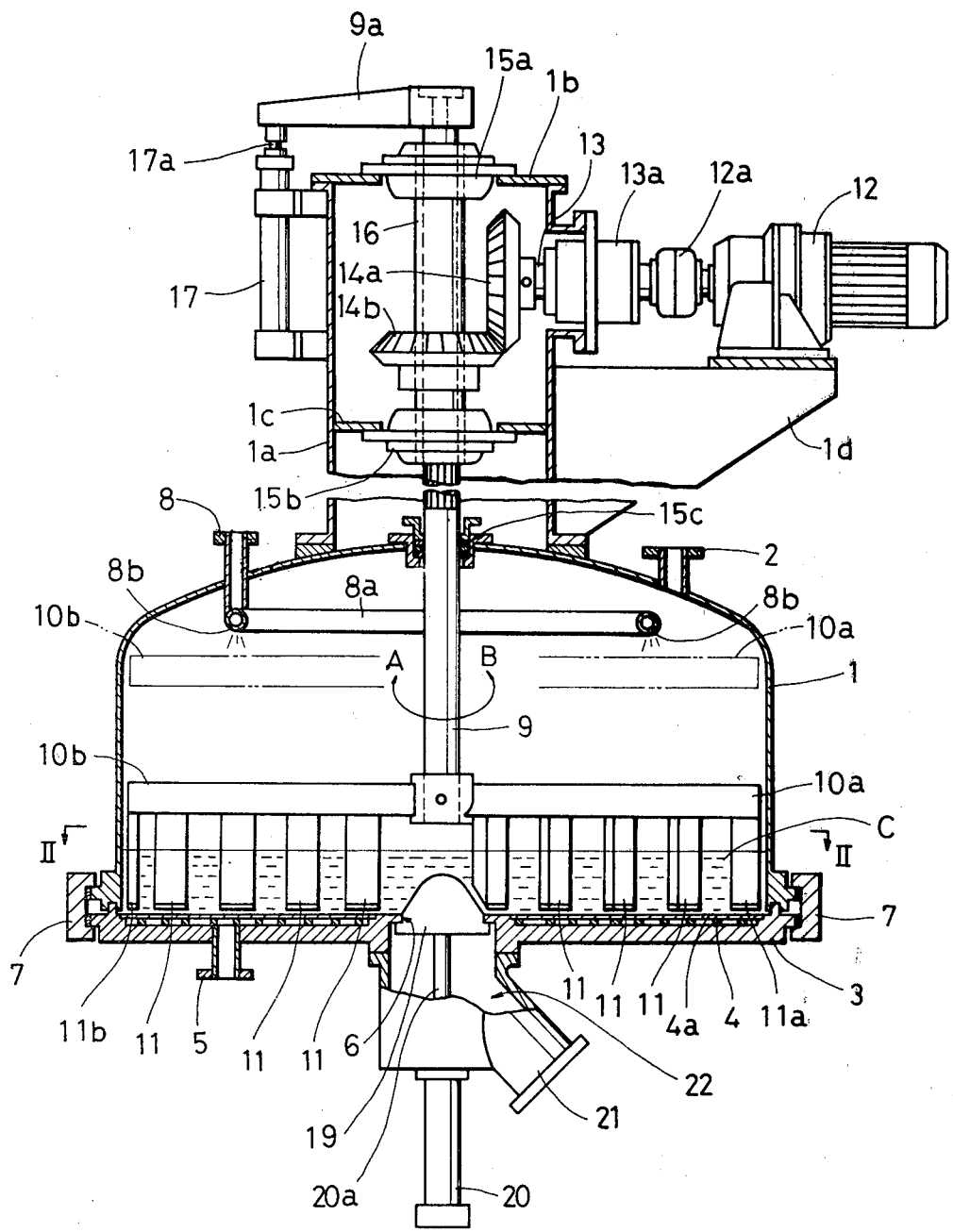
FIG. 1 is a vertical sectional view of a filtering and drying apparatus according to the first embodiment of the present invention.

As generally shown in FIG. 1, reference numeral 1 is a cylindrical casing which is closed at the top thereof and opened at the bottom thereof. The casing 1 is provided with a sllury inlet 2 and a wash spray inlet 8 at the top thereof. The lower end of the wash spray inlet 8 is connected to a spray supply pipe 8a which is annularly horizontally disposed at the upper inside of the casing 1. The spray supply pipe 8a has on its lower surface a plurality of nozzles 8b. The casing 1 also has a bottom plate 3 detachably connected thereto by means of a quick clamping mechanism 7. The bottom plate 3 carries a filter plate 4 thereon which in turn supports a filter medium 4a through which the slurry liquid is filtered.

Extending downwardly of a portion of the bottom plate 3 is a filtrate outlet 5 through which the filtrate is discharged to thereby collect cakes C on the filter medium 4a. The quick clamping mechanism 7 is effective to open and close the bottom plate 3 relative to the casing 1, so as to facilitate replacement of the filter medium 4a.

The bottom plate 3 also has an opening 6 at the center thereof and a valve chamber 22 disposed beneath the opening 6. Extending obliquely to the right (as viewed in FIG. 1) of the valve chamber 22 is an outlet 21 for dischaging cakes C. The valve chamber 22 further includes a fluidic cylinder 20 connected thereto and extending downwardly thereof. The fluidic cylinder 20 has a rod 20a secured thereto, the upper end of which has a discharge valve 19 extending into the central portion of the cake C layer.

Extending upwardly of and mounted on the top central portion of the casing 1 is a frame 1a to which are fixedly connected a top plate 1b, an intermediate plate 1c, a bracket 1d and a fluidic cylinder 17, as generally illustrated in FIG. 1.

The frame 1a supports a rotary shaft 9 which is vertically slidably engaged with, as by spline and other suitable means, a shaft sleeve 16 which in turn is supported by a pair of upper and lower bearings 15a and 15b secured to the top plate 1b and the intermediate plate 1c of the frame 1a. The rotary shaft 9 is rotatably sealed by a sealed portion 15c provided at the central top portion of the casing 1.

The fluidic cylinder 17 includes a rod 17a, its upper end being connected to one end of an interlocking arm 9a disposed generally above the frame 1a. The other end of the interlocking arm 9a rotatably connected to the upper end of the rotary shaft 9. Thus, when the interlocking arm 9a is moved up and down by the rod 17a, the rotary shaft 9 is allowed to rotate as well as to reciprocate vertically along its own axis.

The bracket 1d supports a reversible motor 12 which drives a driving shaft 13 through a coupling 12a and a bearing 13a. A driving bevel gear 14a is secured to the outermost end of the driving shaft 13 and engageable with a driven bevel gear 14b fitted over the shaft sleeve 16 as by a key or the like. With this arrangement, the rotary shaft 9 may be effectively rotated because of the shaft sleeve 16 being splinedly engaged therewith.

The rotary shaft 9 is provided with a pair of rotary arms 10a and 10b fixedly connected to the lower end thereof and extending at right angles thereto. The rotary arms 10a and 10b are provided with a plurality of stirring blades 11, 11a and 11b which are triangular in cross section and fixedly connected to the underside of the arms 10a and 10b in such a manner as to form a comb-like configuration, as most clearly seen in FIG. 3.

Figure 2:
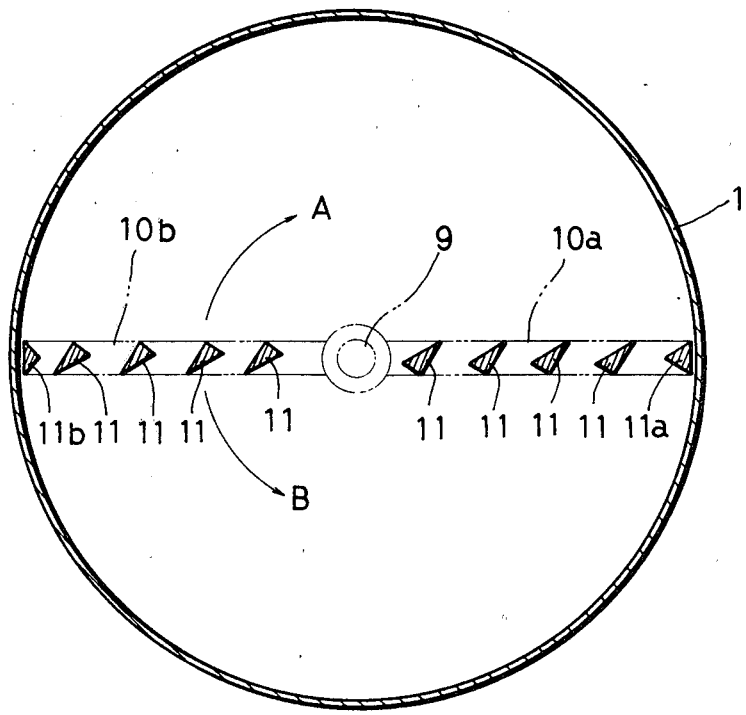
FIG. 2 is a transverse sectional view taken along the line II—II of FIG. 1.
Figure 3:
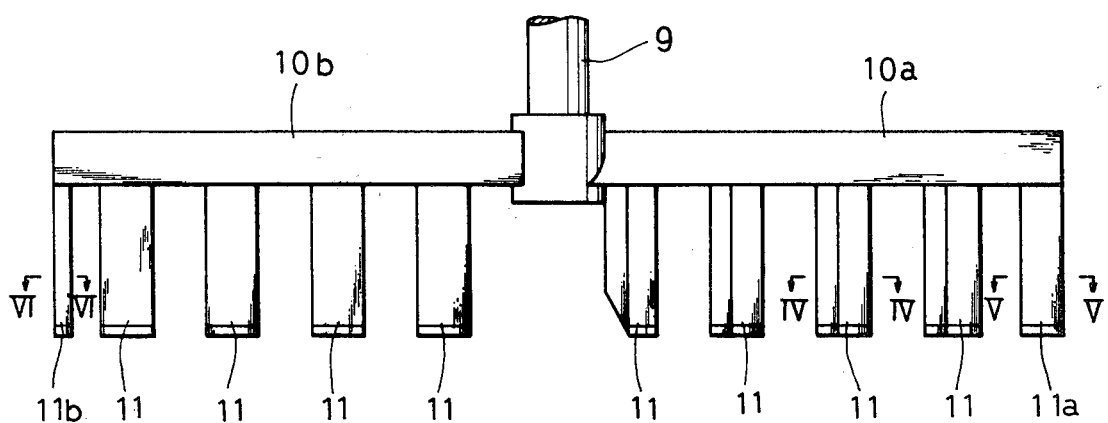
FIG. 3 is a side sectional view, on an enlarged scale, of the rotary arms of the apparatus shown in FIG. 1.

Attention is now directed to FIG. 2 which illustrates in detail each of the stirring blades 11, 11a and 11b. Each of the stirring blades 11 is disposed both on the rotary arms 10a and 10b in such a manner that the rotational locus generated by each stirring blade 11 on the arm 10a overlaps with that generated by each on the arm 10b, to thereby eliminate untouched cake surfaces.

Referring now to FIG. 4, shown therein is an enlarged view of the stirring blade 11. As may be seen, the stirring blade 11 has generally triangular cross section, and its three corners are shown generally at a, b and c. The loci generated by the corners a, b and c through rotation of the rotary shaft 9 are indicated by lines La, Lb and Lc. The distances between the loci La and Lb and between the loci Lb and Lc are indicated by $l_1$ and $l_2$ respectively. It is important to note that, according to the present embodiment, the distance $l_1$ is so determined as to be substantially equal to the distance $l_2$. With this arrangement, when the rotary shaft 9 is rotated clockwise (in the direction of arrow A in FIGS. 2 and 4), cakes C are caused to be scraped off by the corner b generally in two directions, that is to the right and left.

Conversely, when the rotary shaft 9 is rotated counterclockwise (in the direction of arrow B of FIGS. 2 and 4), cakes C are caused to move always inwardly, that is leftward relative to the direction of rotation, as clearly seen in FIG. 4.

FIGS. 5 and 6 illustrate in detail the stirring blades 11a and 11b which are attached to the outermost end of the rotary arms 10a and 10b respectively, and as seen, the stirring blades 11a and 11b also have triangular cross section. Thus, when the rotary shaft 9 is rotated in both directions of arrows A and B, all the cakes C are caused to move inwardly, thereby preventing cakes C from being deposited on or unevenly distributed toward the inner wall of the casing 1.

Furthermore, each of the stirring blades 11, 11a and 11b is provided with edges 18, 18a and 18b formed at the lower end thereof and projecting in the direction of arrow A as shown in FIGS. 4, 5 and 6 (also see FIGS. 7, 8 and 9). Each of the edges 18, 18a and 18b has an upper surface sloping upwardly toward the stirring blades 11, 11a and 11b respectively.

In operation, the casing 1 is filled with slurry under filtering pressure. As should be apparent, the slurry is introduced through the inlet 2 located at the top of the casing 1, and is filtered by the filter medium 4a disposed on the bottom plate 3 carried by the casing 1. The filtrate thus produced is then discharged through the filtrate outlet 5 beneath the bottom plate 3, so that cakes C collect on the filter medium 4a.

After the filtration cycle is finished, wash spray is supplied through the inlet 8 into the casing 1. The cakes C collected on the filter medium 4a are washed while they are stirred by the stirring blades 11, 11a and 11b which revolve in the direction of arrow A with the rotation of the rotary shaft 9.

The cakes C are then subjected to aeration for dehydrating and drying operation. When the cakes C collected on the filter medium 4a are condensed to the extent that they are hardly stirred and dried, the rotary arms 10a and 10b are once raised by means of the fluidic cylinder 17 after the filtration cycle has been finished, and then they are lowered so as to permit effective drying operation for the cakes C. In this instance, each of the edges 18, 18a and 18b provided at the lower end of the stirring blades 11, 11a and 11b is effective to scrape the cakes C progressively from their upper surfaces to thereby produce fragments of cakes C. This permits accelerated stirring and drying operations, and may lead to ease of cake discharge.

It is to be noted that a suitable heating apparatus may be employed in conjunction with the casing 1 so as to facilitate drying operation.

After the aeration cycle has been finished, the discharge valve 19 is opened to allow the cakes C to be discharged through the outlet 21. During the process, the rotary shaft 9 is rotated in the reverse direction, that is in the direction of arrow B, so that cake discharge may be effected by the actuation of the stirring blades 11, 11a and 11b.

Figure 10:
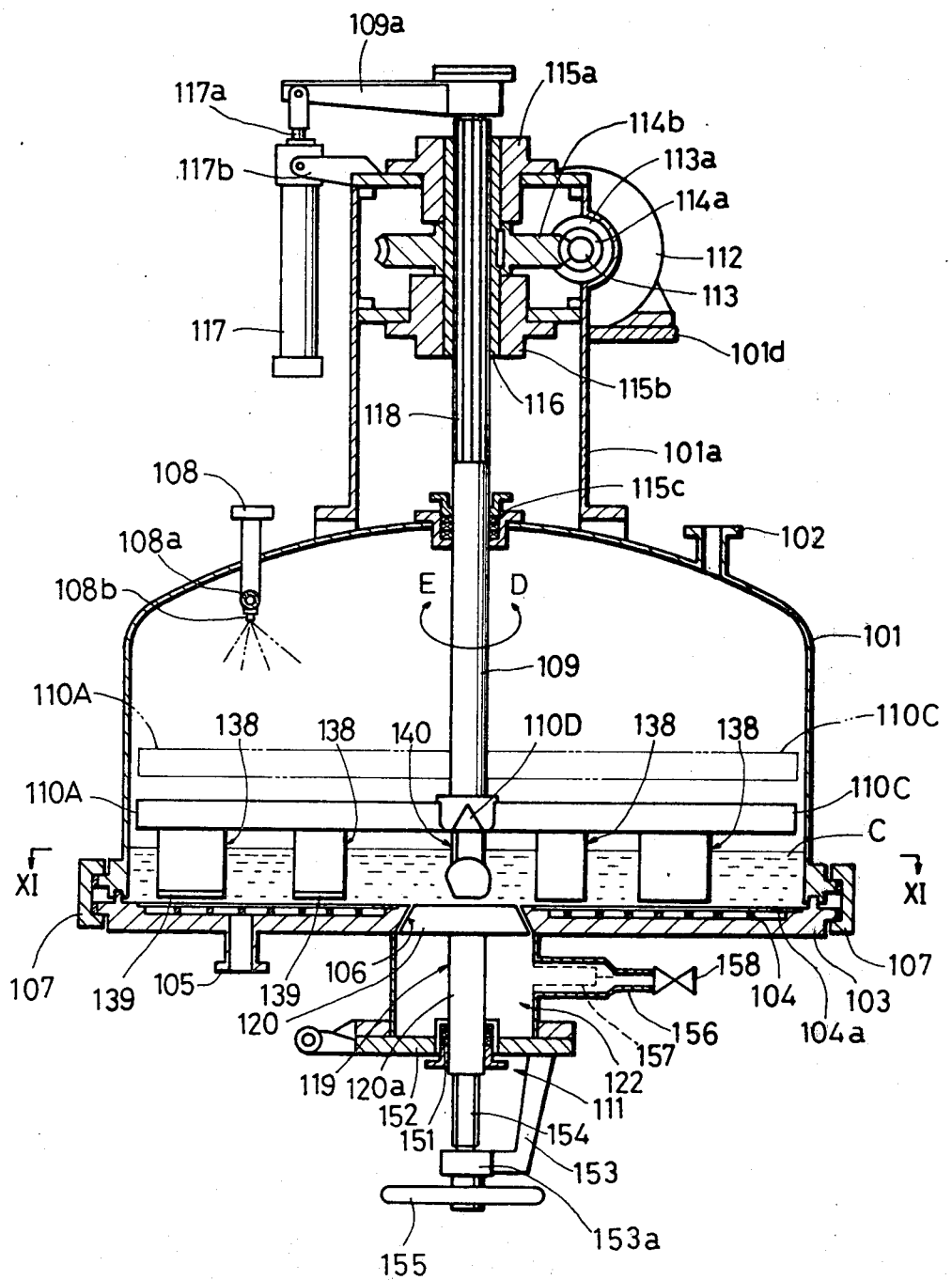
FIG. 10 is a vertical sectional view of a filtering and drying apparatus according to the second embodiment of the present invention.
Figure 11:
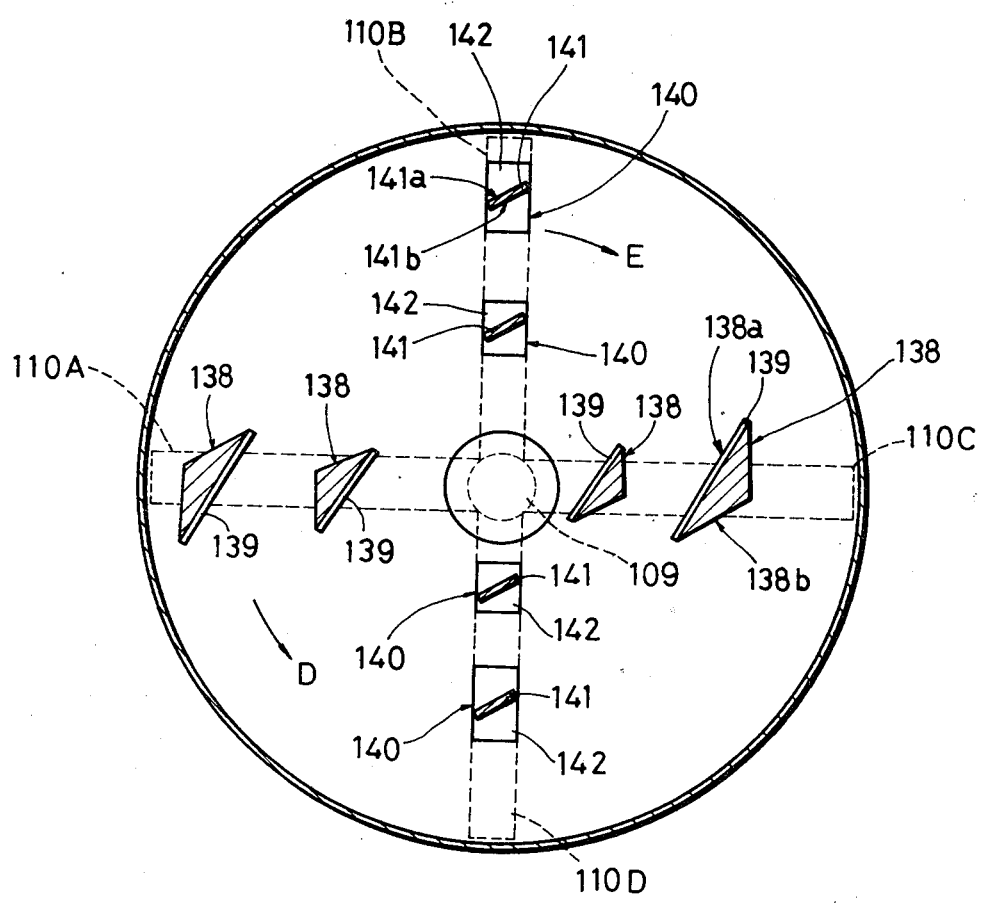
FIG. 11 is a sectional view taken along the line XI—XI of FIG. 10.
Figure 12:
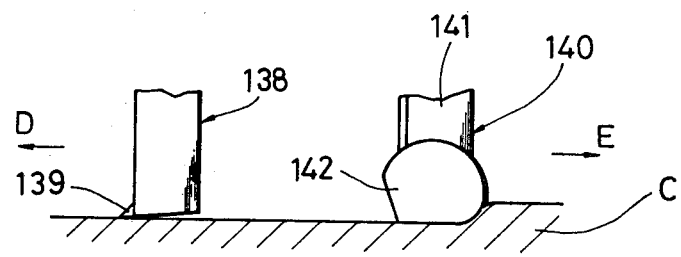
FIG. 12 is an illustrative view showing the operation of the scraping member and the flattening member shown in FIG. 10.

Attention is now directed to FIGS. 10 through 12 which illustrate the second embodiment of the present invention.

In the drawings, there is shown a casing 101 having a slurry inlet 102 and a wash spray inlet 108 at the top portion thereof; and a bottom plate 103 at the bottom thereof. The wash spray inlet 108 has a spray pipe 108a connected at the lower end thereof and disposed generally in the casing 101. The spray pipe 108a is provided with a plurality of nozzles 108b. The bottom plate 103 is detachably connected to the casing 101 by means of a quick clamping mechanism 107. The bottom plate 103 receives a filter plate 104 which in turn supports a filter medium 104a for filtering the slurry.

A filtrate outlet 105 is provided beneath the bottom plate 103 so as to discharge the filtrate. The bottom plate 103 has an opening 106 at the center thereof and a discharge mechanism 111 disposed beneath the opening 106 and adapted for discharging cakes C after filtration. As generally seen in FIG. 10, the discharge mechanism 111 comprises a valve body 119 having a conical valve head 120 adapted to open and close the opening 106, a valve chamber 122, a valve stem 120a for the valve body 119 and a valve cover 152.

A sealed portion 151 is provided at the central portion of the valve cover 152 and is adapted to sealingly carry the valve stem 120a for vertical movement therethrough. The valve stem 120a has a handwheel shaft 154, the upper end of which being threadably engageable therewith and the lower end being fixedly connected to a handwheel 155 for rotation therewith.

The valve cover 152 further includes a bracket 153, one end of which being fixedly connected to the cover 152 and the other end being fixedly connected to a bearing 153a adapted to rotatably carry the handwheel shaft 154 therein. The valve cover 152 may be opened and closed by means of a hydraulic cylinder (not shown).

The discharge mechanism 111 further includes an exhaust nozzle 156 extending generally horizontally from the side portion of the valve chamber 122, and the exhaust nozzle 156 has a strainer 157 as indicated by a dotted line, and a rapid exhaust valve 158 extending rightwardly of the strainer 157 as viewed in FIG. 10.

Reference numeral 101a is a frame disposed on and extending from the top of casing 101. The frame 101a is provided with a fluidic cylinder 117 pinned thereto through a support member 117b and with a reversible motor 112 supported by a bracket 101d.

A worm shaft 113 having a worm 114a is connected to the driving shaft (not shown) of the motor 112. The worm 114a is rotatably carried by a bearing 113a and engaged with a worm wheel 114b.

Extending upwardly of the casing 101 and into the frame 101a is a rotary shaft 109 which is rotatably carried by a pair of bearings 115a and 115b through a spline sleeve 116 with which slidably engages a spline 118 of the rotary shaft 109. The worm wheel 114b is keyed to the outside of the spline sleeve 116.

A sealed portion 115c is provided at the top central portion of the casing 101, which serves to seal the rotary shaft 109 and the casing 101.

The upper end of the rotary shaft 109 is rotatably connected to an interlocking arm 109a. The outermost end of the interlocking arm 109a is connected to a rod 117a of the fluidic cylinder 117. With this arrangement, the rotary shaft 109 is vertically movable by the fluidic cylinder 117 and also rotatable by the reversible motor 112.

As generally illustrated in FIG. 11, four rotary arms 110A, 110B, 110C and 110D are connected radially to the lower end of the rotary shaft 109, so as to form a crossed configuration.

A plurality of scraping members 138 having triangular cross section are provided beneath the opposing rotary arms 110A and 110C. When the scraping members 138 are rotated by the rotary shaft 109, the rotational locus of each scraping member 138 is so configured as to overlap with each other.

Each of the scraping members 138 is provided, on the side directed in the forward direction (in the direction of arrow D as viewed in FIG. 11) with an inwardly facing surface 138a which serves to move the cakes C toward the central opening 106. The lower end of the inwardly facing surface 138a has a scraping edge 139 which in turn has an upper surface sloping upwardly toward the scraping member 138. Further, on the side directed in the reverse direction (in the direction of arrow E as viewed in FIG. 11), there is provided an outwardly facing surface 138b which serves to move the cakes C outwardly.

The rotary arms 110B and 110D have a plurality of flattening members 140 extending downwardly thereof. Each of the flattening members 140 comprises a stirring plate 141 and a flattening bar 142. The rotational loci of the flattening members 140 are overlapped with each other, in the same manner as with the scraping members 138, so as to eliminate untouched cake surfaces and permit effective stirring and scraping operation.

Additionally, each of the stirring plates 141 has an outwardly facing surface 141a which serves to move the cakes C outwardly during forward rotation, and an inwardly facing surface 141b which serves to move the cakes C inwardly to the central opening 106 during reverse rotation.

The flattening bar 142 is secured to the lower end of the stirring plate 141, its lower surface being substantially plane and its end facing the reverse direction of rotation (in the direction of arrow E) being curved.

In operation, the slurry introduced through the inlet 102 is positively filtered by the filter medium 104a aided by a suitable pressure-applying means (not shown) for pressurizing the casing 101, or a suction means (also not shown) effective to suck the slurry from the underside of the filter plate 104. The filtrate thus produced is discharged through the filtrate outlet 105 to thereby collect cakes C on the filter plate 104.

During subsequent washing cycle, the reversible motor 112 is rotated so as to cause forward rotation (in the direction of arrow D) of the rotary shaft 109, while the rotary arms 110A through 110D are lowered in cooperation with the rotary shaft 109 being moved by the rod 117a of the fluidic cylinder 117. At this moment, wash spray is supplied through the inlet 108 into the casing 101 to be jetted from the nozzles 108b, and thus the cakes C are effectively stirred and mixed while they are scraped by the scraping edges 139 provided at the lower end of the scraping members 138 of the rotary arms 110A and 110C, so as to become a number of fragments.

The mixture containing the cake fragments and wash spray is moved toward the central area of the casing 101 by the inwardly facing surfaces 138a of the scraping members 138, while it is at the same time moved outwardly by the action of the outwardly facing surfaces 141a of the stirring plates 141 attached to the rotary arms 110B and 110D. As a result, a circulating flow is developed in the mixture so as to permit increased stirring action for the cake fragments with a resultant effective breakdown thereof.

After the washing cycle has been finished, the rotary arms 110A through 110D are raised along with the rotary shaft 109, the mixture is filtered again through the filter medium 104a aided by the pressure-applying means or the suction means, in the same manner as described with respect to the slurry liquid, and is discharged through the outlet 105 to thereby collect cakes C again.

The cakes C are then subjected to aeration and dehydration under pressure or suction. As the dehydrating operation is advanced, that is as the dehydration degree is increased, cracks are developed on the cake surfaces to the extent that the dehydration may not be efficiently effected. To cope with this condition, the reversible motor 112 is rotated in the reverse direction so as to cause the rotary shaft 109 to rotate in the direction of arrow E while the rotary arms 110A through 110D are lowered, the flattening bars 142 are caused to depress the cake C surfaces. As a consequence, the cracks on the cake C surfaces are crushed as generally illustrated in FIG. 12, so as to enhance the dehydration effect on the crushed cakes C.

The dehydrated cakes C are then dried by hot air or steam. Upon rotation of the rotary shaft 109 in the forward direction, the cakes C being dried are moved inwardly by the inwardly facing surfaces 138a of the scraping members 138, while they are at the same time moved outwardly by the outwardly facing surfaces 141a of the strring plate 141. Because of the overall cakes C being subjected to the stirring operation, they may be dried in a short time without providing unevenness of the drying condition.

The cakes C thus dried are then transferred to the subsequent discharge cycle. To begin with, the valve body 119 is lowered by the use of the handwheel 155 to provide an aperture for cakes C to drop. It is to be noted, however, that cakes C will not drop under gravity because of the cakes C being bridged at this stage. Air is then introduced under pressure into the casing 101 so as to enter the valve chamber 122 through the cake layer, which will be pressurized to substantially the same condition as that in the casing 101. The rapid exhaust valve 158 is opened so as to cause only the pressurized air in the valve chamber 122 to be released instantly through the strainer 157. As a result, the valve chamber 122 is brought to the atmospheric pressure, while the casing 101 is still maintained at the pressurized condition. The resultant pressure difference causes the cakes C to drop into the cahmber 122, so as to make a hole at the central portion thereof. It is to be noted that after removal of the dried cakes C from the chamber 122, a path is formed from the casing 101 inside to the chamber 122. Accordingly, when the rotary arms 110A through 110D are lowered with the rotary shaft 109 in forward rotation, and dried cakes C are scraped off by the scraping edges 139 of the scraping members 138 as well as are moved toward the central opening 106 by the inwardly facing surfaces 138a. During the process, the dried cakes C are dropped in sequence into the valve chamber 122 through which the cakes C are to be discharged.

What is claimed is:

1. A filtering and drying apparatus adapted for use in filtration of slurry liquids and in drying of cakes produced through the filtration of slurry liquids, comprising a vertically disposed casing, a bottom plate detachably carried at the bottom of said casing and supporting a filter plate thereon, a valve chamber provided at the central portion of said bottom plate and adapted for discharging the cakes, and an upright rotary shaft disposed in the center of said casing for vertical movement along its own axis and for forward and reverse rotations about its own axis, said rotary shaft being provided at the lowermost end thereof with at least a pair of rotary arms extending at right angles to said rotary shaft and having a plurality of stirring blades, said stirring blade having on one side thereof a face effective to scrape off the cakes to the right and left and on the other side thereof a face effective to move the cakes toward the central portion of said bottom plate.

2. A filtering and drying apparatus as defined in claim 1 wherein the rotational loci generated by said stirring blades with rotation of said rotary arms are so determined as to overlap with each other for elimination of untouched cake surfaces.

3. A filtering and drying apparatus as defined in claim 1 wherein said stirring blades are of a triangle in cross section.

4. A filtering and drying apparatus as defined in claim 3 wherein the distance between both loci generated by the outermost corner of the triangle and the intermediary corner of the triangle is substantially equal to the distance between both loci generated by the intermediary corner of the triangle and the innermost corner of the triangle.

5. A filtering and drying apparatus as defined in claim 1 wherein each of said stirring blades includes at its lowermost end an edge extending substantially horizontally and said edge has an upper surface sloping upwardly toward said stirring blade.

6. A filtering and drying apparatus as defined in claim 1 wherein each of said rotary arms includes on the underside of the outermost end thereof a stirring blade having a face effective to move the cakes toward said rotary shaft at all times irrespective of the direction of rotation of said rotary shaft.

7. A filtering and drying apparatus adapted for use in filtration of slurry liquids and in drying of cakes produced through the filtration of rotary liquids, comprising a vertically disposed casing, a bottom plate detachably carried at the bottom of said casing and supporting a filter plate thereon, a valve chamber provided at the central portion of said bottom plate and adapted for discharging the cakes, and an upright rotary shaft disposed in the center of said casing for vertical movement along its own axis and for forward and reverse rotations about its own axis, said rotary shaft being provided at the lowermost end thereof with at least a pair of rotary arms extending at right angles to said rotary shaft and having a plurality of scraping members secured to one of said rotary arms and a plurality of flattening members secured to the other of said rotary arms, said scraping member having an inwardly facing surface effective to move the cakes toward said valve chamber during forward rotation of said rotary shaft and an outwardly facing surface effective to move the cakes outwardly during reverse rotation of said rotary shaft, said flattening member having a stirring plate and a flattening bar secured to the lower end of said stirring plate, said stirring plate having an outwardly facing surface effective to move the cakes outwardly during forward rotation of said rotary shaft, said flattening bar being effective to flatten the cake surfaces, said valve chamber having a discharge valve carried therein for vertical movement and an exhaust valve carried thereon for alternately sealing and releasing said valve chamber.

8. A filtering and drying apparatus as defined in claim 7 wherein the rotational loci generated by each of said scraping members are so determined as to overlap with each other, and the rotational loci generated by each of said flattening members are so determined as to overlap with each other for elimination of untouched cake surfaces.

9. A filtering and drying apparatus as defined in claim 7 wherein said scraping members are of a triangle in cross section.

10. A filtering and drying apparatus as defined in claim 7 wherein each of said scraping members includes at its lowermost end an edge extending substantially horizontally and said edge has an upper surface sloping upwardly toward said scraping member.

* * * * *